(12) United States Patent
Chakraborty et al.

(10) Patent No.: US 7,839,824 B2
(45) Date of Patent: Nov. 23, 2010

(54) ALLOCATION OF PERIODICALLY DISTRIBUTED FRAMES OF WIRELESS COMMUNICATION

(75) Inventors: Soumen Chakraborty, Santa Clara, CA (US); Sindhu Verma, Santa Clara, CA (US); Manish Airy, Santa Clara, CA (US); Anuj Puri, Santa Clara, CA (US)

(73) Assignee: BECEEM Communications Inc., Santa Clara, CA (US)

( * ) Notice: Subject to any disclaimer, the term of this patent is extended or adjusted under 35 U.S.C. 154(b) by 711 days.

(21) Appl. No.: 11/888,057

(22) Filed: Jul. 31, 2007

(65) Prior Publication Data
US 2009/0034467 A1 Feb. 5, 2009

(51) Int. Cl.
H04B 7/216 (2006.01)
H04B 1/38 (2006.01)
H04W 72/00 (2009.01)
H04W 4/00 (2009.01)

(52) U.S. Cl. .................... 370/330; 370/312; 370/342; 455/450; 455/509

(58) Field of Classification Search ......... 370/236–281, 370/329–342, 473–536; 455/452–455, 509–512, 455/561–571
See application file for complete search history.

(56) References Cited
U.S. PATENT DOCUMENTS 6,747,966 B1 * 6/2004 Ahmavaara ................. 370/337
2006/0046789 A1 * 3/2006 Huh et al. ................... 455/571
2006/0209734 A1 * 9/2006 Son et al. .................... 370/312
2007/0060141 A1 3/2007 Kangude et al.
2007/0184842 A1 * 8/2007 Pedersen et al. ............ 455/450
2007/0238482 A1 * 10/2007 Rayzman et al. ......... 455/552.1
2007/0245202 A1 * 10/2007 Kim et al. ................... 714/748
2007/0263740 A1 * 11/2007 Kwon et al. ................. 375/260
2008/0062944 A1 * 3/2008 Smith et al. ................. 370/342
2008/0176577 A1 * 7/2008 Bourlas et al. .............. 455/454
2008/0311919 A1 * 12/2008 Whinnett et al. ............ 455/447
2009/0022098 A1 * 1/2009 Novak et al. ................ 370/329
2009/0303945 A1 * 12/2009 Tanigawa et al. ........... 370/329
2010/0067458 A1 * 3/2010 Tanigawa et al. ........... 370/329

* cited by examiner

Primary Examiner—M. Phan
(74) Attorney, Agent, or Firm—Brian R. Short, Esq.

(57) ABSTRACT

Methods of allocating a plurality of periodically distributed frames of communication between a first wireless transceiver and a second wireless transceiver are disclosed. One method includes detecting periodic data for transmission between the wireless base station and the wireless mobile unit. A transmission map that maps frequency and time slots is generated for transmission of the data packets. Allocation information is included within less than all of a plurality of transmission maps of the plurality of periodically distributed frames. The allocation information designates frequency and time slots in which data packets identified as a periodic data type are transmitted to the second wireless transceiver for the plurality of periodically distributed frames.

33 Claims, 6 Drawing Sheets

| Syntax (Allocation Type = Sticky) 310 | Exemplary size Number of bits 320 | Descriptions 330 |
|---|---|---|
| 1. Starting Frame | 16 bits | Starting Frame of Periodically Distributed Frames |
| 2. Periodicity | 16 bits | Periodicity in Units of Frames |
| 3. Allocation Period | 16 bits | Duration of Periodicity – Number of Frames – Could be Optional |
| 4. Frequency and Time Slot | 16 bits | Allocation Starting Symbol Offset and Starting Sub-channel Offset |
| 5. Number of Frequency and Time Slots | 10 bits | How Many Slots Allocated |
| 6. Modulation and Coding Scheme | 10 bits | Modulation and Coding Scheme Selected for Allocated Slots |
| 7. Other Options | X bits | Others – such as Multiple Base Stations, Varying Slot Locations, Varying Groupings |

FIGURE 3

ALLOCATION OF PERIODICALLY DISTRIBUTED FRAMES OF WIRELESS COMMUNICATION

FIELD OF THE DESCRIBED EMBODIMENTS

The invention relates generally to wireless communications. More particularly, the invention relates to making allocations for periodic data packet traffic in a wireless system.

BACKGROUND OF THE INVENTION

Wireless systems are increasingly being used to carry both data and real-time traffic such as voice. The wireless system need to be designed so that both data and real-time traffic can be carried efficiently while meeting the QoS requirements.

FIG. 1 shows an example of a wireless system that includes a base station 110 wirelessly communicating with multiple mobile units 120, 122, 124. The data packets transmitted between the base station 110 and the mobile units 120, 122, 124 can include both data and voice data packets. As a result, the QoS requirements vary between mobile units 120, 122, 124 depending on the type of data packets being transmitted between the mobile units 120, 122, 124 and the base station 110.

The present WiMax (IEEE802.16) standard includes numerous limitations for carrying voice traffic efficiently. For example, the medium access protocol (MAP) overhead can be as much 50% of downlink frames for voice traffic. Methods for conveying bandwidth allocation can be inefficient, modulation and coding selections can be sub-optimal and uplink allocations can be inefficient.

It is desirable to have a system and method of efficiently communicating transmission scheduling of data packets requiring varying levels of QoS. It is additionally desirable to efficiently communicate bandwidth allocations and improve modulation and coding selections.

SUMMARY OF THE INVENTION

An embodiment includes a method of allocating a plurality of periodically distributed frames of communication between a first wireless transceiver and a second wireless transceiver. The method includes detecting periodic data for transmission between the first wireless transceiver and the second wireless transceiver. A transmission map that maps frequency and time slots is generated for transmission of the data packets. Allocation information is included within less than all of a plurality of transmission maps of the plurality of periodically distributed frames. The allocation information designates frequency and time slots in which data packets identified as a periodic data type are transmitted to the second wireless transceiver for the plurality of periodically distributed frames.

Another embodiment includes a method of allocating periodic transmission for a plurality of wireless communication frames between a wireless base station and a wireless mobile unit. The method includes detecting periodic data for transmission between the wireless base station and the wireless mobile unit. The base station generates a transmission map that maps frequency and time slots for transmission of the data packets. The base station includes allocation information within one of a plurality of transmission maps of the plurality of transmission frames, the allocation information designating at least one frequency and time slot in which a periodic data type is to be transmitted to the wireless mobile unit for the plurality of transmission frames.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 3 shows an example of a modified 802.16 information element.

DETAILED DESCRIPTION

Methods and apparatuses for allocating periodically distributed frames of wireless communication are disclosed. Embodiments of the methods and apparatuses provide efficient scheduling of transmission between wireless transceivers. The methods and apparatus can be utilized by a wireless base station to provide for more efficient communication of scheduling to mobile units.

Figure 1:
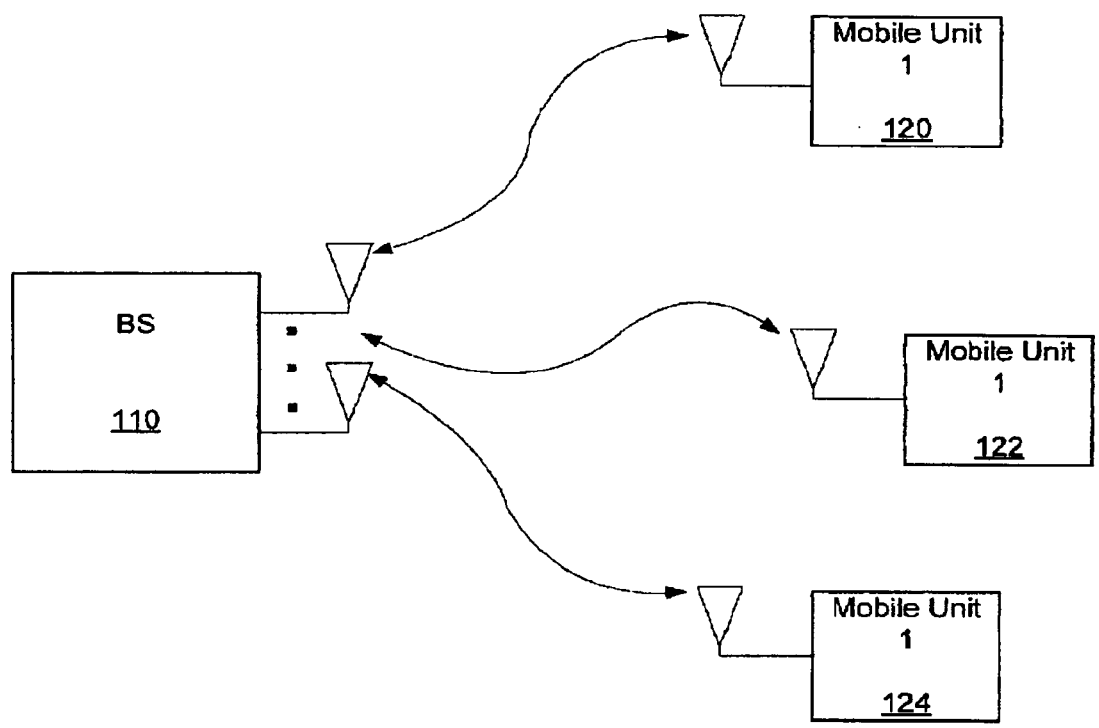
FIG. 1 shows an example of a wireless system that includes a base station wirelessly communicating with multiple mobile units.
Figure 2:
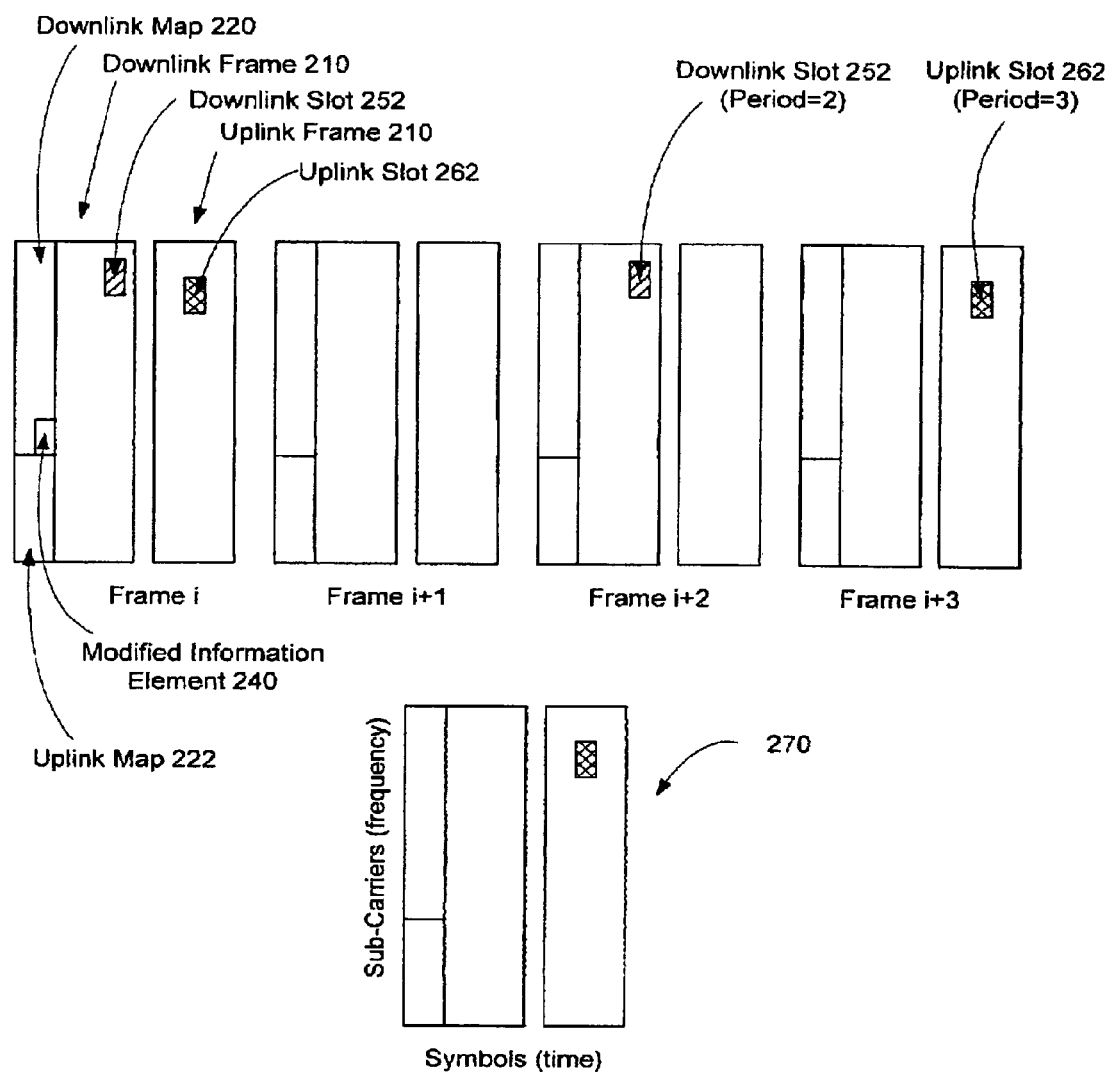
FIG. 2 shows one example of a set of transmission schedules that provide allocations of distributed frames of wireless communication.

FIG. 2 shows one example of a set of transmission frames that provide allocations of distributed frames of wireless communication. As shown, a series of downlink (DL) and uplink (UL) frames (frame i, frame i+1, frame i+2, frame i+3) depict scheduled communication between at least one base station and one or more subscribers.

An exemplary first frame (frame i) includes a downlink MAP 220, an uplink MAP 222 and a modified information element 240. The first frame (frame i) includes a downlink frame 210 and an uplink frame 212. The downlink MAP 220 and the uplink MAP 222 provide mobile units wirelessly connected to a base station, with a schedule of, for example, frequency and time slots in which data packets are to be transmitted through either a downlink from the base station to at least one mobile unit, or an uplink from one of the mobile units to the base station.

An exemplary frame 270 shows the downlink and uplink frames including sub-carriers and symbols. WiMax (802.16) wireless communication includes orthogonal frequency division multiplexing (OFDM) and the frames include sub-carriers or sub-channels and OFDM symbols. A slot defines specific sub-carriers and OFDM symbols carried in the slot which are to be used for data transmission. For the embodiment of FIG. 2, the downlink and uplink frames include maps 220, 222, and slots. The maps designate slots in which particular mobile units are to receive data packets (downlink traffic) and when particular mobile, units are to transmit data packets (uplink traffic).

As shown in FIG. 2, the downlink map 220 also includes a modified information element 240. There can similarly be a modified information element for the uplink map 222. Details of the modified information element 240 are described in detail later, but generally, the information element includes information about frequency and time slots in which periodic data packets (such as voice data packets) are to be transmitted through either uplinks or downlinks. An example of allocation information is a modified information element of an 802.16 MAP.

An 802.16 information element is used to indicate slots for downlink or uplink frame for transmission to a specific mobile unit. The information element, however, only defines the transmission for a single frame, not multiple frames. Therefore, without modification, the 802.16 information element is not useful for transmission of periodic data packets. As previously described, scheduling transmission of periodic data packets within 802.16 MAPs is very inefficient.

The modified information element 240 identifies one or more frequency and time slots in the downlink and/or uplink for transmission of periodic data packets. The allocation information is included within typically one (however, there could be more than one) frame that sets the allocation of frequency and time slot(s) for multiple frames. The modified information element 240 also includes periodic information that identifies for which frames the allocation is being made. That is, for example, a period of two sets the period to two frames, and every other frame has the frequency and time slot(s) allocation. If the period is set to three, then every third frame has the frequency and time slot(s) allocation.

FIG. 2 shows a downlink slot 252 (frequency and time slot) being allocated having a period of two. That is, the frame i has the allocation (downlink slot 252) as shown, and the frame i+2 has the allocation (downlink slot 252) as shown. FIG. 2 also shows an uplink slot 262 being allocated having a period of three. That is, the frame i has the allocation (uplink slot 262) as shown, and the frame i+3 has the allocation (uplink slot 262) as shown. As previously described, the frequency and time slot(s) and the period of the slots of the periodic data packets are identified by the modified information element 240. The information element can also include a number that sets the number of frames for transmitting the periodic data packets.

The modified information element 240 designates the scheduling of the transmission of the periodic data packets. Therefore, the MAPs do not need to schedule the transmission of the periodic data packets during every frame in which the transmission is to occur. This greatly reduces the overhead of the MAP scheduling. The modified information element can be included within one frame of many frames, and therefore, additionally reduces the overhead of communicating transmission scheduling.

Embodiments of the modified information element can also include modulation and coding selections of the transmission of the periodic data packets. Generally, base stations select modulation and coding for transmission based on the quality of the wireless link the packets are going to be transmitted over. The modulation and coding selection can be conservatively made to ensure successful transmission of the periodic data packets even if the quality of the wireless links varies over the time duration of the periodic frames identified by the modified information element for transmission of the periodic data packets.

Embodiment of wireless systems can adapt a number of hybrid automatic repeat request (HARQ) re-transmissions based on the modified information element. In two-way systems, an opportunity for requesting that a data packet be retransmitted upon detection of an error may be available. A NAK may be sent upon detection of an error using, for example, a parity bit check or a cyclic redundancy check (CRC), and then the original data packet may be discarded. Upon receipt of a NAK, the packet may simply be retransmitted in its original form. This simple combination of ARQ and FEC is sometimes called Type I hybrid ARQ, and the term "hybrid ARQ" is usually reserved for a more complex procedure where a receiver may combine previously received erroneous packets with a newly received packet in an effort to successfully ascertain the contents of the packet. The general procedure in a HARQ system is that a receiver may generate an indicator, such as a NAK, upon detection of an error in the received data packet. Unlike Type I ARQ, the receiver does not discard previously received erroneous packets. The receiver may keep (that is, store) the entire or portions of the erroneous packet because the erroneous packet may still contain worthwhile information, and therefore is not discarded when using HARQ. By combining erroneous packets, the receiver may be able to assist the FEC to correct the errors.

An embodiment includes a wireless transceiver (base station) selecting a smaller number of HARQ re-transmission for data packets that are identified as the periodic data type rather than other data types. Another embodiment includes the base station selecting the number of HARQ re-transmission based on a number of frames within the plurality of transmission frames. Another embodiment includes the base station selecting the number of HARQ re-transmission based on a velocity of the mobile unit.

FIG. 3 shows an example of a modified 802.16 information element. The modified information element includes information that is used for more efficient allocation of transmission of periodic data packets. The information element includes an allocation indicator. That is, the allocation indicator designates the allocation provided by the information element as sticky or not. If sticky, the allocation "sticks" for a number of frames as can be determined from the information element itself.

The information element of FIG. 3 is depicted as a table of information element information. A first column 310 provides syntax, a second column 320 provides an exemplary number of bits used to convey the information, and a third column 330 provides a brief description of function of the information.

Figure 4:
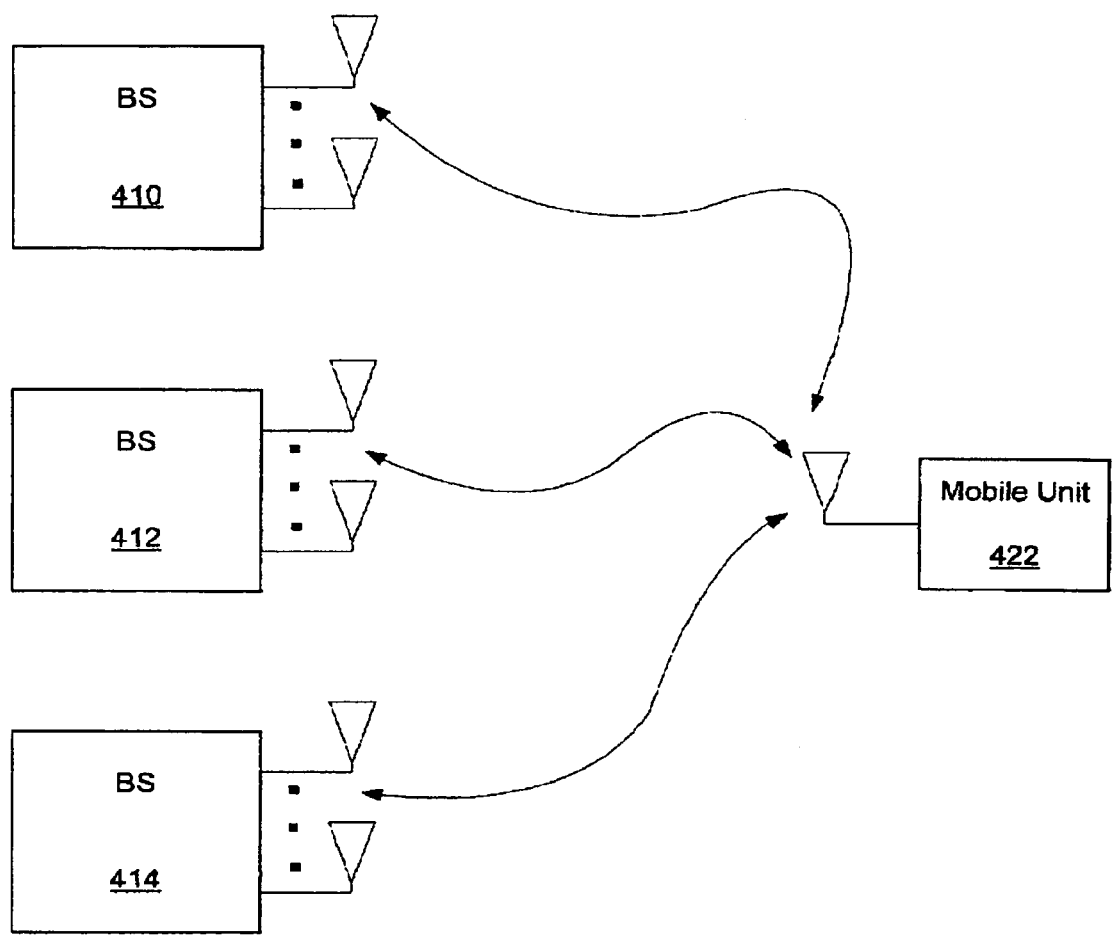
FIG. 4 shows an example of a wireless system that includes multiple base stations communicating with mobile units according to the transmission schedule of FIG. 2.

A first piece of information includes the starting frame that indicates the start of the allocations of distributed frames. A second piece of information includes the periodicity of the allocations. That is, the allocations are made for every N units of frames. A third piece of information includes the allocation period. That is, a period that can be defined, for example, by a number of frames. As will be described, the allocation period can be indefinite. That is, the allocation period can be open-ended, and the period can then be terminated by either the base station, or the mobile unit. A fourth piece of information includes designation of the frequency and time slot(s) of either the downlink and/or the uplink of the allocations. A fifth piece of information includes the number of frequency and time slots are allocated. A sixth piece of information includes the modulation and coding scheme FIG. 4 shows an example of a wireless system that includes multiple base stations communicating with mobile units according to, for example, the transmission schedule of FIG. 2. This exemplary multiple base station embodiment provides spatial and macro diversity. The modified information element can communicate to the mobile unit(s) that the periodic frames for transmission of periodic data packets can be distributed amongst multiple base station, providing the spatial and macro diversity. Of course, this information should also be communicated between the multiple base stations.

One of the multiple base stations can be designated as a serving base station, which is typically, the base station that communication with the mobile unit was initiated. For an embodiment, only the serving base station retransmits data packets identified as periodic data type, when re-transmits are requested by the mobile unit.

Figure 5:
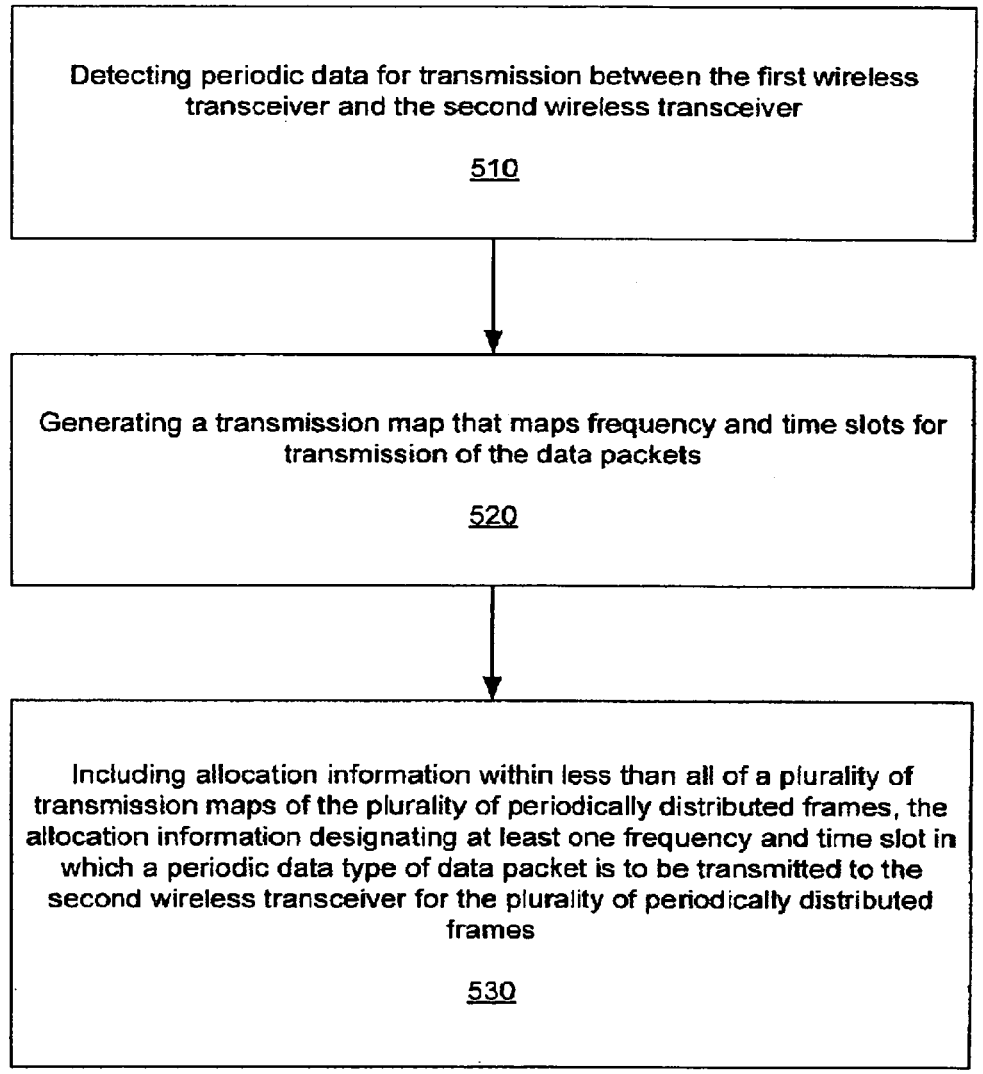
FIG. 5 is a flow chart that includes steps of one example of a method of allocating a plurality of periodically distributed frames of communication between a first wireless transceiver and a second wireless transceiver.

FIG. 5 is a flow chart that includes steps of one example of a method of allocating a plurality of periodically distributed frames of communication between a first wireless transceiver and a second wireless transceiver. A first step 510 includes detecting periodic data for transmission between the first wireless transceiver and the second wireless transceiver. A second step 520 includes generating a transmission map that maps frequency and time slots for transmission of the data packets. A third step 530 includes including allocation information within less than all of a plurality of transmission maps of the plurality of periodically distributed frames, the allocation information designating at least one frequency and time slot in which a periodic data type is to be transmitted to the second wireless transceiver for the plurality of periodically distributed frames.

In the following description, reference is made to the first wireless transceiver and the second wireless transceiver to make it clear that the described methods apply to wireless systems in general. However, it is to be understood that an embodiment includes the first wireless transceiver being a base station of a wireless system, and the second wireless transceiver being a mobile unit.

The overhead required for transmitting scheduling of the plurality of periodically distributed frames is greatly reduced by providing allocation information once for a set of frames rather than including the allocation information for each frame. The allocation information is not required to be included within every transmission frame. The allocation information can be included within less than all of the plurality of transmission maps. One embodiment includes the allocation information being within one of the plurality of transmission maps, which more specifically can be the first transmission map of the plurality of transmission maps. For one embodiment, the allocation information includes a modified 802.16 information element.

The number of periodically distributed frames included within the plurality of periodically distributed frame can be selected in several different ways. For one embodiment, the first wireless transceiver can select the number, and communicate it to the second wireless transceiver within the allocation information. The first wireless transceiver can select the number of periodically distributed frames based on the transmission channel to the second wireless transceiver, the velocity of the second wireless transceiver and other factors. The first wireless transceiver can make the allocation for an indefinite period of time. The allocation can then be cancelled (de-allocated) at a later time (frame) when it is to be changed, or is no longer needed.

Another embodiment includes the number of the plurality of periodically distributed frames being determined by the second wireless transceiver, and communicated to the first wireless transceiver. The second wireless transceiver can select the number of periodically distributed frames based on the transmission channel, its velocity and/or the expected duration of packet flow. The number can be communicated to the first wireless transceiver. As the velocity increases, the number of periodically distributed frames will typically decrease. Additionally, as the velocity increases, typically the modulation and coding rate decreases.

The number of the plurality of periodically distributed frames can be allocated, and then de-allocated at a later time. More specifically, one embodiment includes the number of the plurality of periodically distributed, frames being allocated by the first wireless transceiver, and at a later frame, de-allocated by the first wireless transceiver. Another embodiment includes the number of the plurality of periodically distributed frames being allocated by the first wireless transceiver, and at a later frame, de-allocated by the second wireless transceiver.

As previously described, an embodiment includes the first wireless transceiver being a base station and the second wireless transceiver being a mobile unit. Through allocation information (such as, a modified 802.16 information element) the base station allocates the periodic transmission by allocating frequency and time slots for uplink and downlink frames. The allocation information designates one or more frequency and time slot in which a periodic data type is to be transmitted within the uplink frame between the mobile unit and the base station, and/or within downlink frames between the base station and the mobile unit.

The allocated periodic transmission can additionally include various forms of transmission diversity. For example, the allocated frequency and time slot in which a periodic data type data packet is to be transmitted to the second wireless transceiver for different of the plurality of periodically distributed frames changes. The changing frequency and time slot provides both frequency and time diversity of the transmission of the periodically transmitted data. Alternatively, or additionally, spatial diversity can be obtain by transmitting the periodic data type data packets to the second wireless transceiver from at least one of a plurality of first wireless transceivers during at least one frequency and time slot of the plurality of periodically distributed frames. If only one first wireless transceiver (base station) is transmitting to the second wireless transceiver (mobile unit) during the allocated frequency and time slot, an embodiment includes the first wireless transceiver changing during the plurality of periodically distributed frames. If more than one first wireless transceiver is transmitting to the second wireless transceiver, one of the first wireless transceivers can be designated as a serving first wireless transceiver, and only the serving first wireless transceiver retransmits data packets identified as periodic data type, when retransmits are requested by the second wireless transceiver. Typically, the first wireless transceiver (base station) designated as the serving first wireless transceiver is the first wireless transceiver that the second wireless transceiver (mobile unit) makes initial allocation.

Embodiments additionally include determining a modulation and coding scheme for transmission of the periodic data type during the allocated at least one frequency and time slot. The modulation and coding scheme can be selected by a first wireless transceiver (base station) for one or more of the allocated frequency and time slots. For an embodiment, the selected modulation and coding rate is maintained for the duration of the plurality of periodically distributed frames. Because the modulation and coding rate is maintained for the duration of the plurality of periodically distributed frames, an embodiment includes making a conservative selection to ensure that the modulation and coding can sustain transmission for the entire duration. That is, for example, the quality of the wireless link between the base station and the mobile unit can vary during the duration of the plurality of periodically distributed frames. However, the selection of the modulation and coding may occur at the start, or before the transmission of the plurality of periodically distributed frames. Therefore, by selecting a modulation and coding rate that is lower than the link can support at a start of the plurality of periodically distributed frames, the more likely it is that the selected modulation and coding rate will support the link if the link quality varies during the transmission of the plurality of periodically distributed frames. One embodiment includes the modulation and coding scheme being selected by the base station to have a lower rate than requested by the mobile unit.

An embodiment includes the selection of the number of frames of the plurality of periodic distributed frames, and the selection of the modulation and coding scheme being interrelated. Clearly, the longer the duration of the plurality of periodic distributed frames, the more likely the quality of the link between the first wireless transceiver and second wireless transceiver will vary by a larger amount. Therefore, as the number of frames increases, the selection of the modulation and coding which in one embodiment is selected at the beginning of the frames, and is more conservative to account for possibly larger variations in the transmission channel between the first wireless transceiver and the second wireless transceiver.

Various methods can be used to estimate the quality of the link between the first wireless transceiver (base station) and the second wireless transceiver (mobile unit). As described, the link quality can be used to select the modulation and coding of the transmissions. One embodiment includes the second wireless transceiver providing a link quality indicator to the first wireless transceiver that is an indication of a quality of the wireless link between the first wireless transceiver and the second wireless transceiver. For 802.16, the link quality indicator can be an IEEE 802.16 CQICH. For one embodiment, the selected modulation and coding remains the same for the allocated periodic transmission uplink frames. Therefore, for this embodiment, the 802.16 CQICH can be allocated to the mobile unit once for the allocated periodic transmission uplink frames.

The periodic data type packets that are transmitted during the allocated periodic transmission can be retransmitted according to 802.16 hybrid automatic repeat request (HARQ) protocols. An embodiment includes the first wireless transceiver (base station) selecting a smaller number of HARQ re-transmission for data packets that are identified as the periodic data type rather than other data types. Another embodiment includes the base station selecting the number of HARQ re-transmission based on a number of frames within the plurality of transmission frames. Another embodiment includes the base station selecting the number of HARQ re-transmission based on a velocity of the mobile unit.

Power consumption is typically an important performance metric of mobile units. Therefore, it is desirable to power-down the mobile units whenever possible. One method to conserve power is to have the second wireless transceiver go into a sleep mode between plurality of periodically distributed frames allocated by the allocation information.

The data packets that are designated as being periodic data type may have strict latency requirements. For one embodiment, the data packets are voice traffic data packets. One embodiment includes the voice data packet being encapsulated within a larger data unit, such as, a MAC (media access control) PDU (protocol data unit) to be transmitted. Based on latency requirements, it may be possible to combine multiple voice data packets into a MAC PDU before transmission. This can provide additional reduction of overhead because the overhead of a single MAC PDU is less than the overhead of multiple MAC PDUs, each carrying one voice data packet. For an embodiment, at least one of the base station (first wireless transceiver) and the mobile unit (second wireless transceiver) delaying transmission of one or more data packets allowing the data packets to be combined into a large transmission unit. The delay can be selected based on a Quality of Service (QoS) threshold.

As previously described, the allocation information designates at least one time and frequency slot within a transmission frame for transmission of the data packets that are designated as being periodic data type. The designation can additionally include grouping frequency and time slots of the plurality of periodically distributed frames designated for periodic data packets. For one embodiment, the grouping of frequency and time slots is based on modulation and coding scheme selections of the periodic data packets of a plurality of mobile users. For another embodiment, the grouping of frequency and time slots is based on a number of frames of the plurality of periodically distributed frames designated for each of a plurality of mobile users. The grouping can be maintained for a period of the plurality of periodically distributed frames. However, the size of the grouping can vary. Additionally, there can be multiple groupings, wherein sizes of the multiple grouping can vary.

Figure 6:
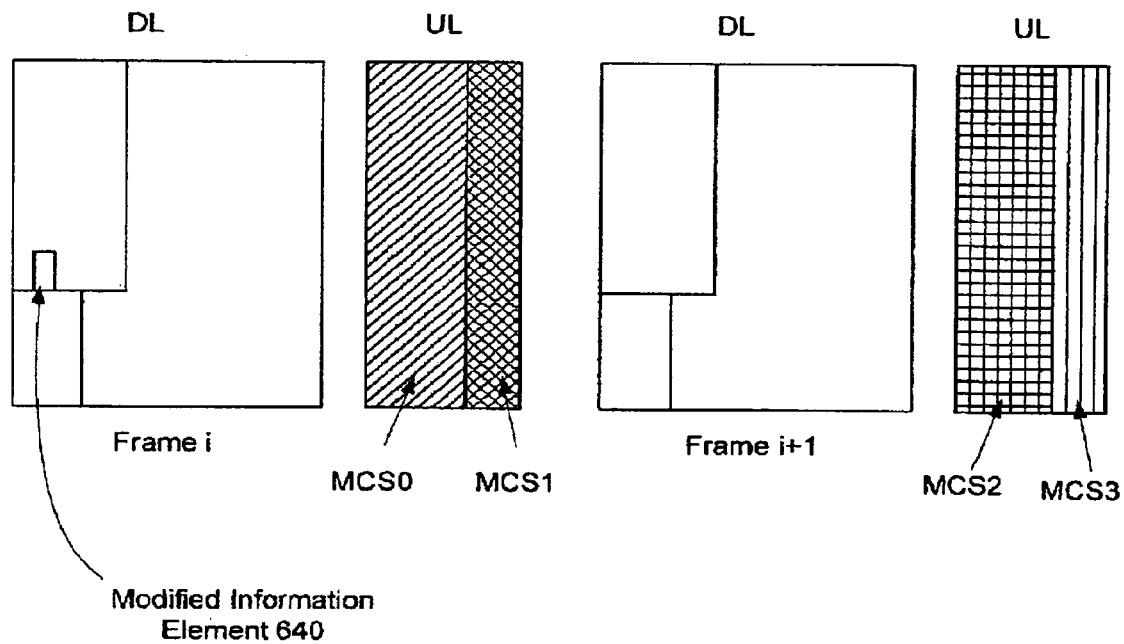
FIG. 6 show one example of a set of transmission schedules that provide allocations of distributed frame of wireless communications, wherein the allocation includes groupings of frequency and time slots.

FIG. 6 show one example of a set of transmission schedules that provide allocations of distributed frame of wireless communications, wherein the allocation includes groups of frequency and time slots. FIG. 6 shows the uplink and downlink frames having grouping that indicate, for example, different selections of modulation and coding (MCS0, MCS1, MCS2, MCS3). An embodiment includes frequency and time slot allocation made within the designated groupings having the modulation and coding as indicated by the predetermined groupings. As shown in FIG. 6, neighboring groupings (as defined by the locations of the groupings within the downlink and uplink frames) are organized, for example, by neighboring modulation and coding rates. Neighboring modulation and coding rates are neighboring if the rates of the modulation and coding are incrementally different. For MSC0 can correspond to QPSK modulation and a ½ coding, which is a neighbor to MSC1 which has QPSK modulation and a ¾ coding. Other successive neighboring modulation and coding rates can be, for example, MCS2 having a 16-QAM modulation and coding, and MCS3 having a 16-QAM, ¾ coding.

Although specific embodiments of the invention have been described and illustrated, the invention is not to be limited to the specific forms or arrangements of parts so described and illustrated. The invention is limited only by the appended claims.

What is claimed:

1. A method of allocating a plurality of periodically distributed frames of communication between a first wireless transceiver and a second wireless transceiver comprising:

detecting periodic data for transmission between the first wireless transceiver and the second wireless transceiver;

generating a transmission map that maps frequency and time slots for transmission of the data packets;

including allocation information within less than all of a plurality of transmission maps of the plurality of periodically distributed frames, the allocation information designating at least one frequency and time slot in which a periodic data type of data packet is to be transmitted to the second wireless transceiver for the plurality of periodically distributed frames;

wherein the first wireless transceiver is a base station and the second wireless transceiver is a mobile unit, and the base station selects a modulation and coding scheme for the at least one frequency and time slot; and wherein the modulation and coding scheme is selected by the base station to comprise a lower rate than a wireless link between the base station and the mobile unit can support at a start of the plurality of periodically distributed frames.

2. The method of claim 1, wherein the allocation information is within one of the plurality of transmission maps.

3. The method of claim 1, wherein a number of the plurality of periodically distributed frames is allocated by a first wireless transceiver.

4. The method of claim 1, wherein a number of the plurality of periodically distributed frames is allocated by a first wireless transceiver, and at a later frame, de-allocated by the first wireless transceiver.

5. The method of claim 1, wherein a number of the plurality of periodically distributed frames is allocated by a first wireless transceiver, and at a later frame, de-allocated by the second wireless transceiver.

6. The method of claim 1, wherein the first wireless transceiver is a base station and the second wireless transceiver is a mobile unit, and wherein allocating periodic transmission comprising allocating frequency and time slots for at least one of uplink and downlink frames between the base station and the mobile unit.

7. The method of claim 6, wherein the allocation information further comprises designating at least one frequency and time slot in which a periodic data type is to be transmitted within the uplink frame between the mobile unit and the base station.

8. The method of claim 1, further comprising changing the at least one frequency and time slot in which a periodic data type data packet is to be transmitted to the second wireless transceiver for different of the plurality of periodically distributed frames.

9. A method of allocating a plurality of periodically distributed frames of communication between a first wireless transceiver and a second wireless transceiver comprising:
   detecting periodic data for transmission between the first wireless transceiver and the second wireless transceiver;
   generating a transmission map that maps frequency and time slots for transmission of the data packets;
   including allocation information within less than all of a plurality of transmission maps of the plurality of periodically distributed frames, the allocation information designating at least one frequency and time slot in which a periodic data type of data packet is to be transmitted to the second wireless transceiver for the plurality of periodically distributed frames;
   further comprising the periodic data type of data packets being transmitted to the second wireless transceiver from at least one of a plurality of first wireless transceivers during the at least one frequency and time slot of the plurality of periodically distributed frames;
   wherein a one of the plurality of first wireless transceivers that transmits to the mobile unit during the allocated frequency and time slot, changes during the plurality of periodically distributed frames; and
   designating one of the plurality of first wireless transceiver as a serving first wireless transceiver, and only the serving base station retransmitting data packets identified as periodic data type, when re-transmits are requested by the second wireless transceiver.

10. The method of claim 1, further comprising determining a modulation and coding scheme for transmission of the periodic data type during the allocated at least one frequency and time slot.

11. A method of allocating a plurality of periodically distributed frames of communication between a first wireless transceiver and a second wireless transceiver comprising:
   detecting periodic data for transmission between the first wireless transceiver and the second wireless transceiver;
   generating a transmission map that maps frequency and time slots for transmission of the data packets;
   including allocation information within less than all of a plurality of transmission maps of the plurality of periodically distributed frames, the allocation information designating at least one frequency and time slot in which a periodic data type of data packet is to be transmitted to the second wireless transceiver for the plurality of periodically distributed frames;
   wherein the first wireless transceiver is a base station and the second wireless transceiver is a mobile unit, and the base station selects a modulation and coding scheme for the at least one frequency and time slot; and
   further comprising selecting the modulation and coding scheme for a plurality of base stations in which a periodic data type of data packet is to be transmitted from the plurality of base stations to the second wireless transceiver for the plurality of periodically distributed frames.

12. The method of claim 1, wherein the modulation and coding scheme for the at least one frequency and time slot is maintained for the plurality of periodically distributed frames.

13. A method of allocating a plurality of periodically distributed frames of communication between a first wireless transceiver and a second wireless transceiver comprising:
   detecting periodic data for transmission between the first wireless transceiver and the second wireless transceiver;
   generating a transmission map that maps frequency and time slots for transmission of the data packets;
   including allocation information within less than all of a plurality of transmission maps of the plurality of periodically distributed frames, the allocation information designating at least one frequency and time slot in which a periodic data type of data packet is to be transmitted to the second wireless transceiver for the plurality of periodically distributed frames;
   wherein the first wireless transceiver is a base station and the second wireless transceiver is a mobile unit, and the base station selects a modulation and coding scheme for the at least one frequency and time slot; and
   wherein the modulation and coding scheme is selected by the base station to comprise a lower rate than a wireless link between the base station and the mobile unit can support at a start of the plurality of periodically distributed frames.

14. The method of claim 1, wherein the modulation and coding scheme is selected by the base station to comprise a lower rate than requested by the mobile unit.

15. A method of allocating a plurality of periodically distributed frames of communication between a first wireless transceiver and a second wireless transceiver comprising:
   detecting periodic data for transmission between the first wireless transceiver and the second wireless transceiver;
   generating a transmission map that maps frequency and time slots for transmission of the data packets;
   including allocation information within less than all of a plurality of transmission maps of the plurality of periodically distributed frames, the allocation information designating at least one frequency and time slot in which a periodic data type of data packet is to be transmitted to the second wireless transceiver for the plurality of periodically distributed frames;
   wherein the first wireless transceiver is a base station and the second wireless transceiver is a mobile unit, and the base station selects a modulation and coding scheme for the at least one frequency and time slot; and wherein a selection of a number of frames within the plurality of periodically distributed frames and the selection of the modulation and coding scheme are interrelated; and wherein the number of frames selected and the modulation and coding scheme selected are dependent upon a velocity of the mobile unit.

16. The method of claim 1, further comprising the second wireless transceiver going into a sleep mode between plurality of periodically distributed frames allocated by the allocation information.

17. The method of claim 1, wherein the second wireless transceiver provides a link quality indicator to the first wireless transceiver that is an indication of a quality of the wireless link between the first wireless transceiver and the second wireless transceiver.

18. A method of allocating a plurality of periodically distributed frames of communication between a first wireless transceiver and a second wireless transceiver comprising:

detecting periodic data for transmission between the first wireless transceiver and the second wireless transceiver;

generating a transmission map that maps frequency and time slots for transmission of the data packets;

including allocation information within less than all of a plurality of transmission maps of the plurality of periodically distributed frames, the allocation information designating at least one frequency and time slot in which a periodic data type of data packet is to be transmitted to the second wireless transceiver for the plurality of periodically distributed frames;

wherein the first wireless transceiver is a base station and the second wireless transceiver is a mobile unit, and the base station selects a smaller number of hybrid automatic repeat request (HARQ) re-transmission for data packets that are identified as the periodic data type rather than another data type.

19. The method of claim 18, further comprising the base station selecting the number of HARQ re-transmission based on a number of frames within the plurality of transmission frames.

20. The method of claim 18, further comprising the base station selecting the number of HARQ re-transmission based on a velocity of the mobile unit.

21. The method of claim 1, wherein the first wireless transceiver is a base station and the second wireless transceiver is a mobile unit, and the method further comprises the base station designating within the allocation information uplink frame time and frequency slots for real-time data packets.

22. The method of claim 1, wherein the first wireless transceiver is a base station and the second wireless transceiver is a mobile unit, and the method further comprises the base station designating within the allocation information uplink frame time and frequency slots for voice traffic data packets.

23. The method of claim 1, wherein the first wireless transceiver is a base station and the second wireless transceiver is a mobile unit, and the method further comprises at least one of the base station and the mobile unit delaying transmission of one or more data packets allowing the data packets to be combined into a large transmission unit.

24. The method of claim 23, wherein the delay is selected based on a Quality of Service (QoS) threshold.

25. The method of claim 1, further comprising grouping frequency and time slots of the plurality of periodically distributed frames designated for periodic data packets.

26. The method of claim 25, wherein the grouping of frequency and time slots is based on modulation and coding scheme selections of the periodic data packets of a plurality of second wireless transceivers.

27. The method of claim 26, wherein the second wireless transceivers are allocated frequency and time slots of one of the groupings based on second transceiver selected modulation and coding scheme selections.

28. The method of claim 25, wherein the grouping of frequency and time slots is based on a number of frames of the plurality of periodically distributed frames designated for each of a plurality of mobile users.

29. The method of claim 28, wherein the second wireless transceivers are allocated frequency and time slots of one of the groupings based on second transceiver selected number of frames of the plurality of periodically distributed frames.

30. The method of claim 25, wherein a size of the grouping can vary.

31. The method of claim 25, further comprising multiple groupings, wherein sizes of the multiple grouping can vary.

32. The method of claim 25, further comprising groupings having neighboring modulation and coding schemes being organized as neighboring groupings within transmission frames.

33. A method of allocating periodic transmission of a plurality of frames of wireless communication between a wireless base station and a wireless mobile unit comprising:

detecting periodic data for transmission between the wireless base station and the second wireless mobile unit;

the base station generating a transmission map that maps frequency and time slots for transmission of the data packets;

the base station including allocation information within one of a plurality of transmission maps of the plurality of transmission frames, the allocation information designating at least one frequency and time slot in which a periodic data type is to be transmitted to the wireless transceiver for the plurality of transmission frames;

wherein the base station selects a modulation and coding scheme for the at least one frequency and time slot; and wherein the modulation and coding scheme is selected by the base station to comprise a lower rate than a wireless link between the base station and the mobile unit can support at a start of the plurality of periodically distributed frames.

* * * * *